United States Patent [19]

Michael

[11] 4,348,608

[45] Sep. 7, 1982

[54] BRUSH WEAR INDICATOR

[75] Inventor: Richard N. Michael, McKean, Pa.

[73] Assignee: General Electric Co., Schenectady, N.Y.

[21] Appl. No.: 183,920

[22] Filed: Sep. 4, 1980

[51] Int. Cl.[3] .......... H02K 13/00

[52] U.S. Cl. .......... 310/242; 310/245

[58] Field of Search .......... 310/239-242, 310/244-247, 229, 230, 68 R, 71, 73; 318/542; 339/5 M, 5 PL, 5 RL; 200/61.4, 61.41, 277

[56] References Cited

U.S. PATENT DOCUMENTS

| | | | |
|---|---|---|---|
| 2,691,114 | 10/1954 | Lykins | 310/246 |
| 3,523,288 | 8/1970 | Thompson | 310/245 UX |
| 4,024,525 | 5/1977 | Baumgartner | 310/245 |
| 4,121,207 | 10/1978 | Jones | 200/61.4 |
| 4,166,227 | 9/1977 | Guglielmo | 310/242 |
| 4,172,988 | 10/1979 | Lowther | 310/245 |
| 4,272,695 | 6/1981 | Buchwald | 310/242 |

*Primary Examiner*—R. Skudy
*Attorney, Agent, or Firm*—Vale P. Myles

[57] ABSTRACT

A brush wear indicator for an electrical machine including a holder for slidably mounting a brush, a self-winding, brush-biasing spring having one of its ends mounted in generally fixed operative relationship on the brush holder in combination with an indicating means electrically connected to either a contact, or a membrane switch, mounted on the relatively fixed end of the brush-biasing spring in a position such that it is contacted by a coiled portion of the spring responsive to the occurrence of a predetermined degree of brush wear. Such engagement is effective to actuate the signal means to indicate the predetermined degree of brush wear.

9 Claims, 3 Drawing Figures

BRUSH WEAR INDICATOR

BACKGROUND OF THE INVENTION

This invention relates to brush wear indicators of the type used to sense and indicate a predetermined degree of brush wear in dynamoelectric machines having either commutators or slip rings on which brushes ride during normal operation of the machines.

It has long been recognized by those using dynamoelectric machines that it is often desirable to provide means for indicating a predetermined degree of brush wear in the machine so that those operating them will be alerted to replace the brushes in a timely manner and thereby avoid undesirably timed shutdown of the machinery. In response to that need a variety of different brush wear indicating mechanisms have been developed. A relatively early example of one such mechanism is shown in U.S. Pat. No. 2,691,114—Lykins which issued in Oct. 5, 1954. In that patent there is disclosed a torsion-spring-biased relatively rigid brush follower arm that is effective to move a switch contact arm against a fixed switch contact responsive to a predetermined degree of brush wear occurring. Closure of the switch contacts is effective to energize a light or other suitable signal means to alert an operator to the occurrence of a given amount of brush wear.

Another type of prior art brush wear mechanism is shown in U.S. Pat. No. 3,523,288—Thompson, which issued on Aug. 7, 1970. That patent discloses a system in which a spring-biased pin is mounted to slide along one side of a brush as the brush wears, then to drop into a recess at a preselected point near the outer end of the brush thereby causing a signal circuit switch to close with a snap action and alert an operator to the predetermined degree of brush wear. A quite similar brush wear indicating mechanism is shown in U.S. Pat. No. 4,121,207—Jones, which issued on Oct. 17, 1978 and discloses the use of an enclosed microswitch in combination with a switch actuating arm having a roller at its outer end that rolls along one side of a brush as it wears until the roller finally drops off the outer end of the brush and closes the switch with a snap action.

Finally, U.S. Pat. No. 4,172,988—Lowther, which issued Oct. 30, 1979 discloses a brush wear indicator assembly in which an electrical contact mounted on the outer end of a brush is moved into engagement with a fixed contact mounted on an insulating member adjacent the path of travel of the brush-mounted contact. As the brush is moved downward by a self-winding spring, responsive to the brush being worn away by a slip ring or commutator on which it rides, the brush-mounted contact eventually engages the fixed contact thus completing a circuit to an indicating signal that alerts the operator of the predetermined degree of brush wear.

All of the foregoing types of prior art brush wear indicating mechanisms, and other known prior art brush wear indicators, have certain disadvantages. Such brush wear indicator mechanisms are often relatively expensive to manufacture because they require the assembly of a number of additional parts that normally are not required in brush mounting and biasing structures. For example, the brush wear indicators shown in the Lykins and Lowther patents discussed above both require the provision of an extra movable switch contact that is actuated either by a rigid switch arm, as in the Lykins disclosure, or by being mounted directly on a brush, as is the Lowther disclosure. Alternatively, such prior art mechanisms are often relatively expensive because their implementation requires special machining and assembly procedures. For example, the Jones patent provides a special aperature in the wall of a brushholder and utilizes a separately mounted microswitch having a roller that operates through the aperture in the brushholder to engage the side of a brush in the holder.

A primary object of the present invention is to overcome the disadvantages inherent in prior art brush wear indicator assemblies and to provide a reliable and relatively inexpensive brush wear indicator.

A further object of the invention is to provide a brush wear indicator that utilizes a self-winding brush-biasing spring to actuate a signal means responsive to the occurrence of a predetermined degree of brush wear so that the spring performs a dual function of biasing the brush and sensing the predetermined degree of brush wear.

Still another object of the invention is to provide a brush wear indicator that utilizes a brush biasing spring to actuate a wear-signalling circuit responsive to the spring coiling on itself to actuate a switch mechanism.

Additional objects and advantages of the invention will become apparent to those skilled in the art from the description of it that follows considered in combination with the accompanying drawings.

SUMMARY OF THE INVENTION

In one preferred form of the invention a brush wear indicator including a brush holder and a self-winding, brush-biasing spring that has one of its ends mounted in a generally fixed operative relationship to the brush holder is provided with an electrical contact mounted in electrically isolated relationship to the fixed end of the spring. An indicating circuit including a light or audible alarm is connected to the contact and is effective to be energized when a coiled portion of the spring engages the contact responsive to a predetermined degree of brush wear occurring, such that the coiled portion of the spring winds on itself and moves the outer end of the brush sufficiently close to the commutator or slip ring on which the brush rides to enable the coiled portion of the spring to engage the contact and complete an electrical circuit through the spring from the brush to the contact. In an alternative embodiment of the invention, rather than mounting an electrical contact on the fixed end of the self-winding spring, a flexible membrane switch is mounted on the fixed end of the spring and is operable responsive to the coiled portion of the spring moving into engagement with the flexible membrane of the switch to close the switch thereby actuating a signal circuit that is connected to the switch.

DESCRIPTION OF THE PREFERRED EMBODIMENTS

Figure 1:
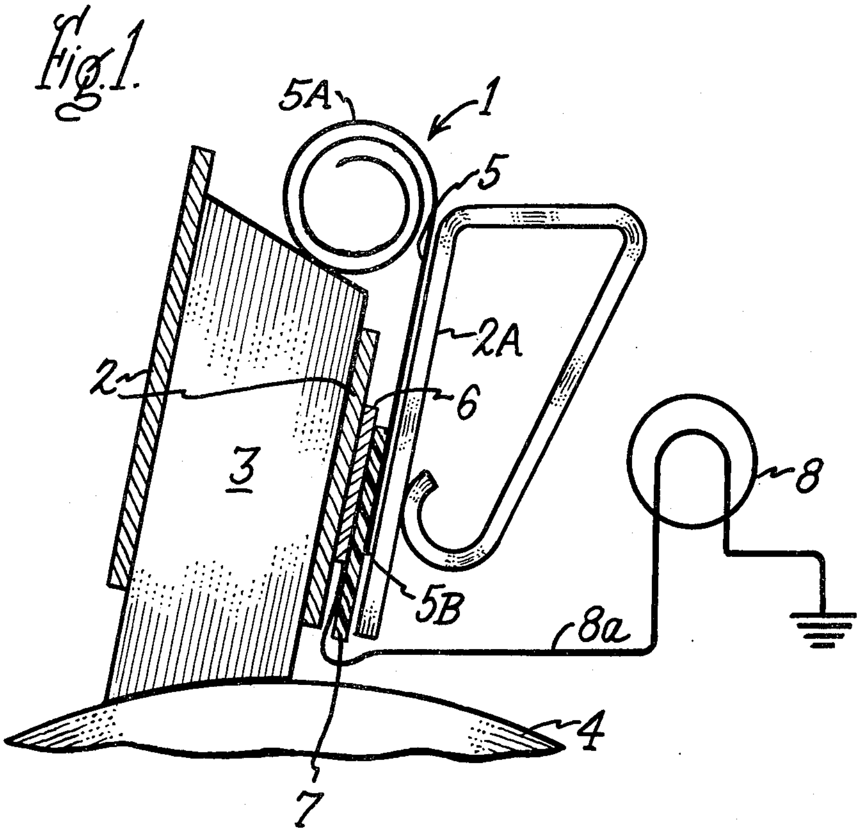
FIG. 1 is a schematic side elevation, partly in cross-section, of a brush wear indicator constructed according to my invention and illustrated in relation to a portion of a commutator or slip ring on which a brush is operably mounted.
Figure 2:
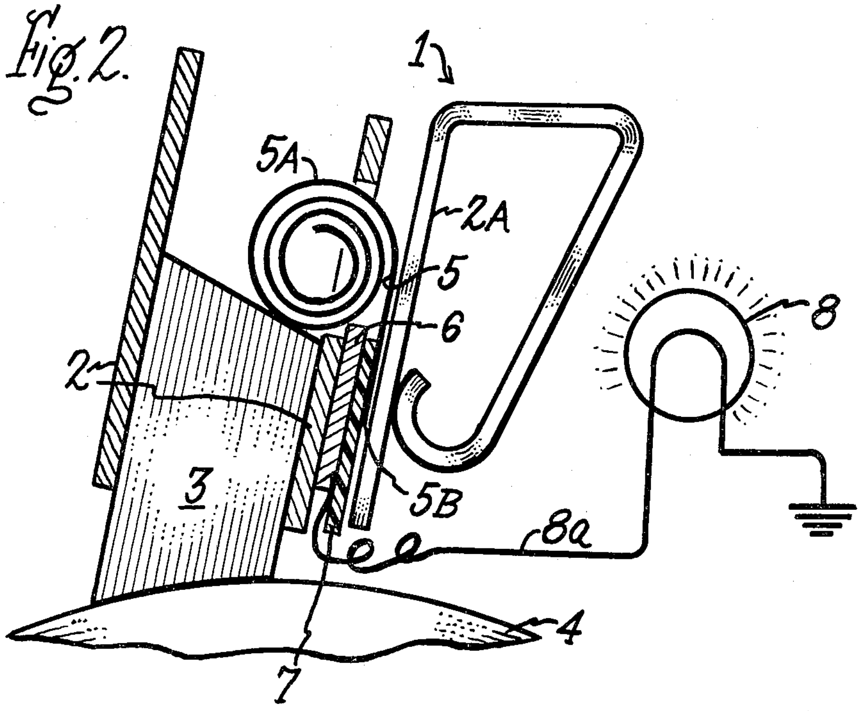
FIG. 2 is another schematic side elevation, partly in cross-section, of the brush wear indicator shown in FIG. 1, but illustrating the brush in a worn condition such that the coiled portion of the self-winding spring of the brush wear indicator is in a position where it completes a circuit between the outer end of the brush and a contact mounted on the relatively fixed end of the spring, according to my invention.

Referring to FIGS. 1 and 2 of the drawing, there is shown a brush wear indicator constructed according to one of the preferred embodiments of my invention. The brush wear indicator 1 includes a conventional brush holder 2 that may be formed of any suitable conventional material and may take a variety of conventional configurations. As is well known in the art, the brush holder 2 need only be designed so that it supports in sliding relationship a carbon brush, such as the brush 3 illustrated in FIGS. 1 and 2, with its inner end in sliding relationship on a rotatably mounted conductor, which normally will be either a commutator or a slip ring. A self-winding spring 5, including a coiled portion 5A, is mounted on a pivotal spring holder 2A, that is movable within a restricted range relative to the brush holder 2, by having one of its ends 5B mounted in fixed position relative to the spring holder 2A. Thus, the end 5B is mounted in generally fixed operative relationship to the brush holder 2, in a well known manner. A number of conventional mounting techniques may be used to fix the end 5B of spring 5 to the spring holder 2A, and generally fix it in position relative to the brush holder 2, such as riveting the spring to the spring holder or welding it in place.

The spring 5 operates to perform a well known brush-biasing operation by applying a biasing force to the outer end of the brush 3 to hold it against one wall of the brush holder and to bias one end of the brush into engagement with the rotatable electrical conductor 4 that is positioned adjacent to the brush holder 2. According to a unique feature of the present invention, an electrical terminal 6 is mounted in electrically isolated relationship to the relatively fixed end 5B of spring 5. The terminal 6 is carefully positioned in relationship to the path of travel of the coiled portion 5A of the spring so that the terminal is contacted by the coiled portion of the spring in response to a predetermined degree of brush wear occurring. Such a degree of brush wear is illustrated in FIG. 2 where it can be seen that the coiled portion 5A of spring 5 has moved into engagement with the upper end of the terminal 6, thereby completing an electrical circuit from brush 3, through the coiled portion of the spring, to the terminal 6. In other words, the predetermined degree of brush wear that has occurred is sufficient to enable the spring 5 to wind up and move its coiled portion 5A sufficiently far toward the generally fixed end of the spring 5B so that the coiled portion 5A engages the terminal 6.

It should be recognized that a variety of different materials and structural arrangements may be used to implement the invention; however, in the illustrated preferred embodiment the spring 5 is formed of electrically conductive spring steel that is effective to both maintain a constant biasing force on the brush, and to conduct electrical current from the brush 3 to the terminal 6. The terminal 6 is soldered with a high temperature tin solder, or is otherwise suitably fastened to, and connected in electrical conducting relationship with, the spring 5, and is electrically isolated from the relatively fixed end 5B of spring 5 by an insulating member 7 that, in the illustrated form of the invention, is formed of a flexible insulating material and is effected to bend with bending movement of the end 5B of the spring 5 on which the insulating member is mounted. In this form of the invention, the insulating member 7 is formed of a commercially available flexible, thermosetting resin material that is bonded to the spring and to the terminal 6 by suitable heat treatment of the resin. The terminal 6 is also formed of a flexible sheet of electrically conductive material, such as copper, that is effective to bend responsive to bending movement of the insulating member 7 on which the terminal 6 is mounted.

In order to alert an operator or maintenance personnel to the predetermined degree of brush wear, a signal means such as the illustrated lamp 8, or other conventional signal means such as a horn or suitable thermally responsive indicating means, is electrically connected by a conventional circuit, such as the illustrated conductors 8A connected to the terminal 6, and is operable to indicate the predetermined degree of brush wear responsive to the coiled portion 5A of the brushfollower spring being moved into conact with the terminal 6, as shown in FIG. 2.

Figure 3:
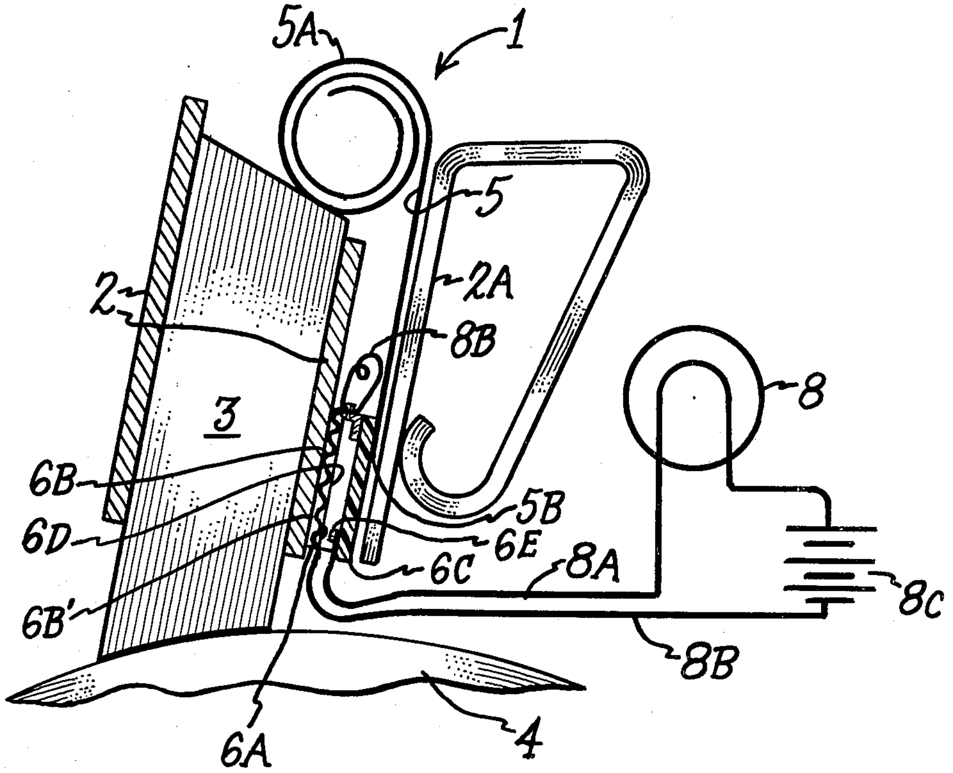
FIG. 3 is another schematic side elevation partly in cross-section, of an alternative embodiment of my invention illustrating a membrane switch mounted on a self-winding, brush biasing spring in a position such that the coiled portion of the spring engages a switch actuating means of the switch to close it responsive to the occurrence of a predetermined degree of brush wear.

Referring now to FIG. 3, an alternative embodiment of the invention will be described using the same reference numbers used in FIGS. 1 and 2 for similar component parts of the invention described. Thus, there is shown a brush wear indicator 1 including a brush holder 2 for supporting a brush 3 in sliding relationship to the holder. A self-winding spring 5 having one of its ends 5B mounted in generally fixed operative position relative to the holder, by being fixedly mounted on a pivotal spring holder 2A, has a coiled portion 5A operable to wind upon itself and apply a biasing force to the brush 3 supported in the holder thereby biasing one end of the brush into engagement with a commutator 4, or a slip ring, of an associated electrical machine positioned adjacent the brush holder 2. Shown in combination with the brush holder and spring is a switch 6A that is mounted in electrically isolated relationship to the spring 5, and is positioned to be closed by the coiled portion 5A of the spring responsive to the occurrence of a predetermined degree of brush wear that enables the spring to wind up sufficiently to move the coiled portion against the switch actuating means 6B′, which is a flexible side-wall diaphragm of the switch housing 6C, and a movable contact arm 6D. As in the earlier discussed embodiment of the invention, a signal means, such as a glow lamp 8, is connected by conventional circuitry like the illustrated wiring 8A and 8B, to the respective contacts 6E and the contact on movable arm 6D of switch 6A, and to a separate power source, such as a battery 8C, so that the lamp 8 is operable to indicate a predetermined degree of brush wear responsive to the coiled portion 5A of the spring engaging the switch actuating means.

In this embodiment of the invention the switch 6A is enclosed in a flexible diaphragm or membrane 6B and is mounted on the one relatively fixed end 5B of spring 5, on the inner side of the coiling movement of the spring, so that when the coiled portion 5A engages the flexible diaphragm of switch 6A, it moves the membrane 6B and an enclosed switch actuating arm 6D to close the switch by engaging the contact on arm 6D with fixed contact 6E. The switch 6A is a normally-open switch and the housing 6C of the switch is adhered to the spring 5 with a commercially available thermo-setting resin, or other suitable mounting means, that secures the switch 6A in its operating position relative to the spring 5, as shown in FIG. 3.

From the foregoing description of the invention, it will be apparent to those skilled in the art that various modifications may be made in the structures shown and described herein, and various alternative embodiments of the invention may be developed; thus, it is my intention to encompass within the following claims the true spirit and scope of the invention.

What I claim as new and desire to secure by Letters Patent of the United States is:

1. A brush wear indicator comprising a brush holder for supporting a brush in slidable relationship thereto, a self-winding spring having one of its ends mounted in generally fixed operative position relative to the holder and having a coiled portion that is operable to apply a biasing force to a brush supported in the holder thereby biasing one end of the brush into engagement with a rotatable electrical conductor positioned adjacent to the holder, an electrical terminal mounted in electrically isolated relationship to said one end of the spring and positioned to be contacted by the coiled portion of the spring responsive to a predetermined degree of brush wear occurring that enables the spring to wind up and move its coiled portion a given distance toward said one end of the spring, and signal means electrically connected to said terminal and operable to indicate said predetermined degree of brush wear responsive to the coiled portion of the spring contacting said terminal.

2. An invention as defined in claim 1 wherein said spring is formed of electrically conductive material and is effective to conduct current from a brush mounted in the holder to said terminal responsive to the coiled portion of the spring being moved into simultaneous engagement with the brush and said terminal.

3. An invention as defined in claim 2 including an electrical insulating member mounted on said spring adjacent said one end thereof, said terminal being mounted on said insulating member and being electrically isolated by it from said spring.

4. An invention as defined in claim 3 wherein said insulating member is formed of a flexible material and is effective to bend with bending movement of the part of the spring on which it is mounted.

5. An invention as defined in claim 4 wherein said terminal is formed of a flexible material and is effective to bend with bending movement of the insulating member.

6. An invention as defined in claim 5 wherein said insulating member is formed of a thermo-setting resin material and is bonded to the spring and said terminal by heat treatment of the resin.

7. A brush wear indicator comprising a brush holder for supporting a brush in sliding relationship thereto, a self-winding spring having one of its ends mounted in generally fixed operative position relative to the holder and having a coiled portion that is operable to wind up on itself and apply a biasing force to a brush supported in the holder thereby biasing one end of the brush into engagement with a rotatable conductor positioned adjacent to the holder, in combination with a switch mounted in electrically isolated relationship to said one end of the spring and positioned to be closed by the coiled portion of the spring responsive to a predetermined degree of brush wear occurring that enables the spring to wind up sufficiently to move its coiled portion against the switch actuating means, and signal means electrically connected to said switch and operable to indicate said predetermined degree of brush wear responsive to said coiled portion of the spring engaging the switch actuating means.

8. An invention as defined in claim 7 wherein said switch is enclosed by a flexible membrane and is mounted on said one end of the spring on the inner side of the coiling movement thereof.

9. An invention as defined in claim 8 wherein said switch is a normally open switch and the housing of the switch is adhered to said spring with a thermosetting resin.

* * * * *